United States Patent Office 3,778,295
Patented Dec. 11, 1973

3,778,295
CHEMICAL PLATING METHOD OF PREPARING RADIATION SOURCE MATERIAL
Paul K. Smith and Richard T. Huntoon, Aiken, and Wilbur C. Mosley, Jr., New Ellenton, S.C., assignors to the United States of America as represented by the United States Atomic Energy Commission
No Drawing. Filed Mar. 8, 1972, Ser. No. 232,933
Int. Cl. B44d 1/02
U.S. Cl. 117—100 B          5 Claims

ABSTRACT OF THE DISCLOSURE

A uniform dispersion of a radioisotope within a noble metal matrix is provided by chemically plating a noble metal coating onto particles including a dissociable compound of the radioisotope. A suspension of the dissociable compound in a chemically reductive solution is prepared and noble metal cations added to produce the noble metal coatings. The coated particles are filtered, dried and heated to calcine the dissociable compound to a refractory powder. The powder can be encapsulated in measured portions or consolidated and shaped into an elongated form for easy apportionment as radiation source material.

BACKGROUND OF THE INVENTION

The present invention was made in the course of, or under, a contract with the United States Atomic Energy Commission.

Field of the invention

The present invention relates to radiation source materials, particularly those including rare and expensive radioisotopes. For example, the spontaneous fission of californium-252 provides a substantial neutron flux but this element is extremely difficult and expensive to produce and fabricate. This element is produced by the long and costly procedure of successive neutron capture in nuclear reactors, beginning with, for instance, uranium-238. Handling this radioisotope is both difficult and hazardous due to neutron fission fragment and alpha emissions. Consequently, californium-252 must be provided in a material form that can be conveniently and safely allotted into precise microgram and milligram quantities for encapsulation as a neutron source with a minimum of process loss. In respect to safety this isotope must be contained in a refractory and stable form to prevent its escape should the encapsulation fail during use or storage.

Similar problems arise in the production and containment of radiation sources from other radioisotopes. Actinides such as actinium-227, plutonium-238, curium-242 or 244, americium-241 or 243 as well as other trans-plutonium isotopes have potential as heat, gamma, beta and alpha sources. Like californium-252 these isotopes are produced by the costly process of neutron capture in a nuclear reactor. Other useful radiation source isotopes such as polonium-210 and cobalt-60 are similarly produced. Fission and decay products including cesium-137, strontium-90, promethium-147 and thulium-170 or 171 also have use as radiation sources and like the above-mentioned isotopes, are difficult to separate, handle and contain safely.

Description of prior art

Prior radiation source materials have included salts of radioisotopes in solution, in precipitate or oxide form. Californium-252, for instance, can be transferred or stored in an acidic aqueous solution of californium nitrate, as a californium oxalate precipitate, perhaps including a carrier metal oxalate, or as californium oxide or oxysulfate obtained by incinerating an ion exchange resin containing californium ions. The allocation of californium material in any of these forms into precise quantities followed by encapsulation to a form usable as neutron sources can be a difficult process if losses are held to an extremely small level as required. Moreover, inconvenient wet chemistry procedures may be required in the purification and encapsulation of each californium neutron source from these prior art material forms. For example see SRO-153 "Guide for Fabricating and Handling $^{252}$Cf Sources" pp. 43-59, 1971, available from National Technical Information Service, U.S. Department of Commerce, and U.S. Pat. 3,627,691 to Boulogne et al.

One method of preparing a californium-251 neutron source or other radiation source material is described in the assignee's copending application Ser. No. 158,-999(70) filed July 1, 1971. This earlier method included blending a solution containing californium values with noble metal powder followed by drying and forming the powder into the desired integral shape. Unfortunately, yields, that is californium in the final product as a percentage of californium in the feed solution, have exceeded 90% only in isolated cases. Generally yields of only about 60–75% have been obtained although substantially all of the californium has been recovered and recycled by leaching the process vessels and tools with dilute nitric acid solution. One of the reasons for these relatively low yields is that the noble metal powder particles are coated on the outside surfaces with californium values from the evaporated solution. Consequently the californium values are prominently exposed and adhere to foreign surfaces contacted in the course of the process. In addition, californium may be entrained in radiolytic gasing that can occur as the solution is concentrated during evaporation.

A prior art method of chemical plating is described in "Electrical and Tensile Properties of Cu-ThO$_2$, Au-ThO$_2$ Pt-ThO$_2$ and Au-Al$_2$O$_3$, Pt-Al$_2$O$_3$ Alloys," J. of Materials Science 5 (1970) 1078–1086. As described in this reference, gold and platinum are chemically plated on thorium oxide particles dispersed in solution, but no suggestion is made that the method would be suitable for plating particles of a dissociable radioisotope compound like an oxalate and subsequently decomposing the dissociable compound to a refractory form.

The direct chemical plating of such as californium oxide particles has not, in general, appeared as a suitable method of producing radiation source material. Radioisotope oxides are normally available in powdered form which is difficult to handle and subdivide into microgram or milligram quantities without loss. Furthermore, ordinarily available forms of, for instance, californium oxide, would require purification prior to chemical plating in the preparation of a radiation source material.

SUMMARY OF THE INVENTION

Therefore, it is an object of the present invention to provide an improved method of preparing a quantity of radiation source material having a uniform distribution of a radioistope within a matrix material for easy apportionment into individual radiation sources.

It is a further object to provide a method of preparing a radiation source material wherein radioisotope particles are safely contained in a stable and refractory form to prevent loss and contamination both during processing and subsequent employment.

It is a further object to provide a method of preparing a radiation source material in which a high percentage yield of radioisotope will be obtained in the product in respect to the radioisotope present in the feed material.

In accordance with the present invention a dissociable radioisotope compound is suspended in a liquid solution and a layer of noble metal is chemically plated onto the suspended particles. The plating is achieved by the addition of noble metal cations and a chemical reductant. The particles are thereby enclosed in protective coatings of noble metal to minimize loss in the subsequent process. After the chemical plating step, the coated particles are filtered from the solution and dried to a powder. The powder is heated to a sufficient temperature to calcine the dissociable radioisotope compound to a refractory substance as the volatile portion of the compound escapes through the noble metal coatings. Since aggregate portions of the calcined powder will have a uniform distribution of radioisotope, the powder can be weighed into precise amounts and encapsulated as radiation sources of predictable strength. Alternatively, the powder is concolidated by pressing and sintering and mechanically shaped into an elongated form which can be apportioned by length into radiation sources of desired strength.

DETAILED DESCRIPTION OF THE PREFERRED EMBODIMENTS

In preparing the radiation source material of the present invention, radioisotope values are dissolved in a dilute acid solution. Where the acid employed is a good oxidizing agent, e.g. nitric acid, the solution should be sufficiently dilute to be inactive in respect to the reductant that will be added in a subsequent step. In some instances a substantially radioinert carrier element can be added to enhance the subsequent precipitation of the radioisotope. For example terbium and samarium cations are suitable carriers in the oxalate precipitation of many actinides and lanthanides. In like manner, radiation sources including a variety of radioisotopes and radiation characteristics can also be produced by the persent method.

The radioisotope is precipitated from the solution as part of an insoluble dissociable compound. Certain metal oxalates, carbonates, phosphates, sulfates and hydroxides that can be decomposed to a metal oxide or other refractory substance with the release of a volatile portion of the compound are suitable for this use. The solution is agitated for a sufficient time during and after the precipitation to finely disperse the dissociable compound as a suspension. Many cation impurities are not precipitated with the radioisotope and consequently the foregoing precipitation step acts to further purify the radioisotope in suspension. This is particularly important in the preparation of californium oxide neutron sources in wire form, where the ability to elongate the material is affected by the proportion of oxide particles within the noble metal matrix.

Chemical plating of the dispersed dissociable compound in suspension is performed by adding noble metal cations to the solution in the presence of a chemical reductant. Chemical reductants, such as hydrazine hydrate, hydroxylamine, ferrous sulfamate or hypophosphorous acid may be suitable for the reduction of most noble metal cations. The noble metal cations can be provided in nitrate or tetramine nitrate solutions for example $Pd(NO_3)_2$ or $Pd(NH_3)_4(NO_3)_2$ However where palladium tetramine dinitrate is employed, care must be taken that glassware containing the suspension is not also plated during the process.

Either the full amount of the reductant or the noble metal cations can be first added to the solution and the other reactant subsequently added in increments. However, in hydrazine reductions, it has been found that larger particle sizes are produced if the noble metal cations are added in increments to a solution containing the hydrazine hydrate and the suspension. This sequence is preferred as the subsequent filtering and shaping steps are facilitated by the larger particle sizes. In addition, certain noble metal cations, for instance palladium, will produce a color change on reduction to the metallic state. This phenomena allows visual or colorimetric monitoring of the plating process if the noble metal is added in small increments after addition of the reductant.

As the plating process proceeds, the suspended particles will gradually acquire a higher average density and consequently begin settling to the bottom if agitation is not provided. Therefore, by stirring intermittently during and after the addition of the noble metal cations, the progress of the reduction reaction can be followed. The plating is near completion when the coated particles rapidly settle to the bottom of the container leaving a clear supernatant solution during a nonstirring interval. In most instances, rapid settling will occur only after the noble metal is plated onto the particles in substantial excess to the amount of the radioisotope compound.

Noble metal cations including palladium, platinum, ruthenium, rhodium, silver, osmium, iridium, and gold can be chemically plated onto the dissociable radioistope particles in practising the persent invention. However, palladium has been found to be a preferred matrix material for use in a radiation source after consideration of numerous properties of this noble metal. For instance, palladium resists oxidation, has a high melting point (1552° C.), alloys readily with californium and other elements, is ductile, dissolves in concentrated nitric acid for recovery of the radioisotope, gives little gamma interference on neutron activation, and is less expensive than many other noble metals.

After completing the plating step, the resulting particles are filtered from the solution and washed. A radiation count check is made on the filtrate to determine if sufficient radioisotope is present to justify recovering.

The dissociable radioisotope compound within the particles is calcined to a refractory substance by breaking the dried filter cake into a powder and heating to a sufficient temperature in an inert gas or slightly reducing atmosphere. The volatile portion of the compound released on calcination penetrates through the particle coatings and escapes from the powder. The calcination temperature is maintained substantially below the noble metal melting point to prevent sealing of the individual particle coatings or sintering the particles together until substantially all of the volatile material has been emitted as a gas.

The calcined powder as thus produced may be an acceptable form of neutron source material, especially if large particle or agglomerate sizes have been obtained in the chemical plating step. Particle or agglomerate diameters in excess of about 50 microns can be conveniently handled without excessive loss of the radioisotope or contamination of process implements. Desired amounts of such a powder can be precisely weighed and encapsulated for use as a radiation source.

In instances where the radiation source material is desired as a disk or elongated shape, the powder is pressed into a compact and sintered at a sufficiently high temperature to integrate the noble metal into a matrix around the radioisotope particles. The sintered compact can be encapsulated for use as a radiation source if the desired quantity of radioisotope is enclosed within the matrix. If smaller sized sources are desired, the compact can be shaped into an elongated member or wire that contains a uniform distribution of radioisotope along its length. Measured lengths of the wire can then be cut and encapsulated to form sources of predictable strength.

The radioisotope-noble metal wire can be shaped by extrusion, swaging, rolling or drawing techniques. A noble metal sheath can be snugly fitted around the compact at the diameter with space at either end to allow elongation of the source material inside a protective cladding. Several elongating steps can be employed with annealing between those steps that produce large reductions in diameter.

The following examples are presented to illustrate specific quantities and procedures for preparing a radiation source materials. It will be clear that variations in the materials, quantities and procedures can be employed within the scope of the present invention.

NEUTRON SOURCE MATERIAL

Example I

About 1 milligram of californium-252 as californium oxysulfate was dissolved in 25 milliliters of 0.1 M $HNO_3$ and combined with 40 milliliters aqueous solution containing 40 milligrams of oxalic acid. The mixture was stirred gently for about 30 minutes to finely disperse and suspend the resulting crystalline californium oxalate throughout the solution. A 10 ml. solution of 85% hydrazine hydrate was added as a reductant in preparation for chemical plating. About 3 grams of $Pd(NO_3)_2$ in 100 ml. of distilled water were prepared and added dropwise to the suspension of californium oxalate while stirring. Palladium metal was produced along with gas evolution as the hydrazine reduced the palladium cations in solution. The palladium chemically plated onto the particles of californium oxalate and gave a dark appearance to the suspension. After a substantial amount of palladium was plated onto the particles, they settled to the bottom of the flask leaving a clear supernatant solution. By alternately stirring and not stirring for about 5 minute intervals, the amount of chemical plating achieved was estimated from the tendency of the particles to settle during the nonstirring intervals.

The plated particles were vacuum filtered onto a glass frit filter and washed with distilled water. The filtered material was dried in a flowing argon atmosphere at about 170° C. to 200° C. for about 12 hours. The dried filter cake was dispersed and heated to about 450° C. for 15 minutes in a 4% $H_2$–96% He atmosphere to calcine the oxalate to the oxide with release of $CO_2$ gas through the palladium coatings. Then the calcined particles were poured into a die and pressed at about 15,000 p.s.i. to form a cylindrical compact 0.6 cm. in diameter. The compact was heated to 1,000° C. in a 4% $H_2$–He atmosphere to ensure that calcination was completed before closing the palladium matrix by changing to argon gas and sintering at 1300° C. for 2 hours. The sintered compact was enclosed in an elongated palladium sheath and swaged into an about 30 cm. long palladium clad wire. The wire was found to have a uniform distribution of refractory californium oxide to within about 5% of the average value.

CARRIER ELEMENTS

Example II

In a procedure similar to that employed in Example I, about 10 mg. of terbium nitrate was added as a carrier to the nitric acid solution prior to the oxalate precipitation. Subsequently, a 30 cm. long palladium clad wire was formed containing in excess of 90% of the original californium present in the nitric acid solution.

In still other procedures samarium was employed as the carrier element with similar results.

OTHER ACTINIDES

Example III

About 2.5 milligrams of curium-242, 25 milligrams of americium-241 and 1 milligram of plutonium-238 within a dilute nitric acid solution were precipitated using oxalic acid to form an oxalate suspension and chemically plated with palladium metal using the procedure described in Example I. The plated particles were filtered from solution, dried and resulting clusters broken into a powder. After calcining at 440° C., the powder was formed into an elongated wire of about 4 cm. length having a distribution of each refractory radioisotope oxide to within about 1% uniformity throughout the length of the palladium matrix. The heat source material produced was found to have a power output of about 50 milliwatts per cm.

It will be apparent that the present method employing an oxalate precipitation step as in the foregoing examples will be applicable to most radioisotopes included within the actinide and lanthanide series of elements.

FISSION PRODUCT—GAMMA SOURCE

Example IV

A solution of cesium-137 and uranium cations in 0.25 M $HNO_3$ are precipitated as a double carbonate, $Cs_3UO_2(CO_3)_2$, in suspension by adding a solution of $K_2CO_3$ while bubbling ozone through the warm mixture. The ozone oxidizes the uranium to U(V) in advance of the precipitation. After adding hydrazine hydrate as a reductant, $Pd(NO_3)_2$ in water is introduced dropwise to plate the suspended double carbonate particles. The particles are filtered from the solution and dried in an inert atmosphere. The plated particles are heated to between 900° C. to 1000° C. to calcine the $Cs_3UO_2(CO_3)_2$ to $Cs_6U_2O_7$ refractory mixed oxide with release of $CO_2$ gas. This mixed oxide may melt or degrade at temperatures well above 1000° C. The plated oxide is then pressed and sintered into a compact, elongated into a wire and annealed at 800° C.

The foregoing example illustrates that radioisotopes formed by nuclear fission can be employed in the present method and that carbonates can also be employed as dissociable compounds suspended in solution in performing the chemical plating step.

The present invention provides a method of preparing radiation source material which gives a high yield of radioisotope in the product with minimal contamination of process implements. The radioisotope is processed in sufficient quantity in each batch to permit subsequent subdivision into a number of separate radiation sources. The radiation source material both before and after subdivision contains the radioisotope as a refractory compound enclosed within a stable matrix material. These features are achieved by chemically plating a gas penetrable coating of noble metal onto suspended particles of a dissociable compound and subsequently calcining the dissociable compound to a refractory substance. The coated particles of refractory substance can be shaped into a compact or an elongated member with little loss or contamination of the die and shaping means. The radiation source material as an elongated member can be conveniently apportioned by length into radiation sources of precise intensity.

What is claimed is:

1. The method of preparing refractory radioisotopic source material comprising:
   (a) preparing a particulate suspension of a dissociable radioisotope compound within an aqueous solution, said compound being selected from the group consisting of californium oxalate, curium oxalate, plutonium oxalate, americium oxalate, casium-uranium carbonate;

(b) chemically plating a palladium metal coating onto the suspended particles by adding to said solution palladium cations and a suitabe chemical reductant for the palladium cation;
(c) filtering the palladium plated particles from said solution and drying to form a powder; and
(d) calcining said powder to a temperature sufficient to form refractory oxide particles of the respective radioisotope but substantially below the melting point of the palladium coating, and thereby forming a gas penetrable coating of palladium metal on the refractory oxide particles.

2. The method of claim 1 wherein said palladium metal is plated onto said particles in substantial excess to the amount of said dissociable radioisotope compound.

3. The method of claim 2 wherein said chemical plating is performed by:
(a) initially adding a sufficient quantity of chemical reductant into said solution to chemically plate palladium metal coatings onto said suspended particles;
(b) incrementally adding said palladium metal cations into said solution while intermittently stirring and until said suspended particles become plated with pallidium and settle leaving a substantially clear supernate solution.

4. The method of claim 1 wherein said radioisotope in said compound is selected respectively from the group of isotopes consisting of californium-252, curium-242, plutonium-238, americium-241, and cesium-137.

5. The method of claim 1 wherein said particulate suspension includes in addition to said dissociable radioisotope compound, a substantially radioinert dissociable compound as a carrier precipitant, said radioinert compound including an element selected from the group consisting of terbium and samarium.

References Cited

UNITED STATES PATENTS

| | | | |
|---|---|---|---|
| 3,627,691 | 12/1971 | Boulogne et al. | 250—106 S |
| 3,640,888 | 2/1972 | Baybarz et al. | 250—106 S |
| 3,635,761 | 1/1972 | Haag et al. | 117—100 B |
| 3,556,839 | 1/1971 | Roy | 117—100 B |
| 3,494,785 | 2/1970 | Barr et al. | 176—91 SP |
| 3,368,979 | 2/1968 | Bobkin | 252—301.1 R |
| 3,697,329 | 10/1972 | Bunker et al. | 250—160 S |

FOREIGN PATENTS

| | | | |
|---|---|---|---|
| 468,976 | 10/1950 | Canada | 252—301.1 R |

OTHER REFERENCES

M. L. Gimpl: "Elec. & Tensil Properties of $Cu-ThO_2$, $Au-ThO_3$, $Pt-ThO_2$, $Au-Al_2O_3$ and $Pt-AL_2O_3$ Alloys," pp. 1078–1086 of Journal of Mat. Science (1970).

WILLIAM D. MARTIN, Primary Examiner

D. C. KONOPACK, Assistant Examiner

U.S. Cl. X.R.

117—160; 176—91 SP; 250—106 S; 252—301.1 R